(No Model.)

M. G. BARBOUR.
BROILER OR TOASTER.

No. 320,529. Patented June 23, 1885.

WITNESSES:
C. S. Gooding.
Fred. B. Dolan.

INVENTOR:
Mary G. Barbour
by her attys
Clarke & Raymond.

UNITED STATES PATENT OFFICE.

MARY G. BARBOUR, OF BRADFORD, MASSACHUSETTS.

BROILER OR TOASTER.

SPECIFICATION forming part of Letters Patent No. 320,529, dated June 23, 1885.

Application filed September 4, 1884. (No model.)

*To all whom it may concern:*

Be it known that I, MARY G. BARBOUR, of Bradford, in the county of Essex and State of Massachusetts, have invented a new and useful Improvement in Broilers or Toasters, of which the following is a full, clear, and exact description, reference being had to the accompanying drawings, forming a part of this specification in explaining its nature, in which—

Figure 1:
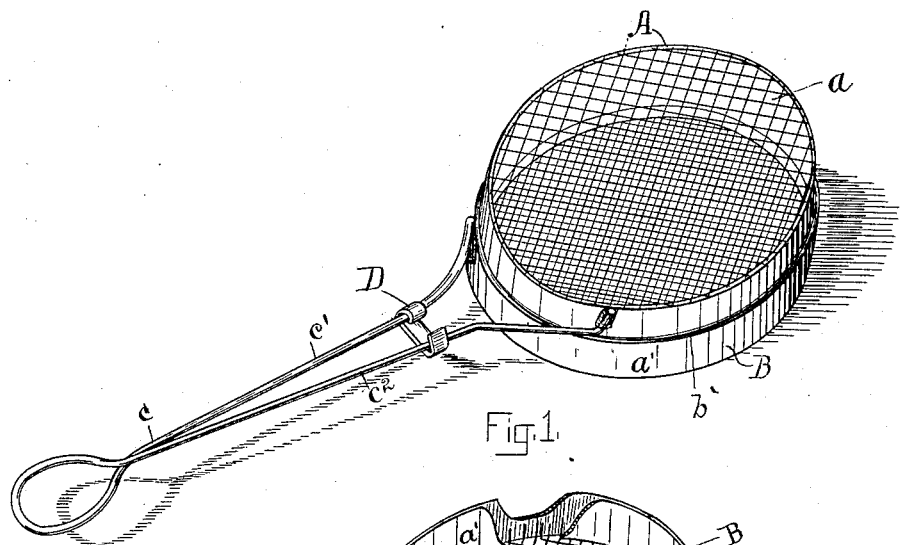
Figure 2:
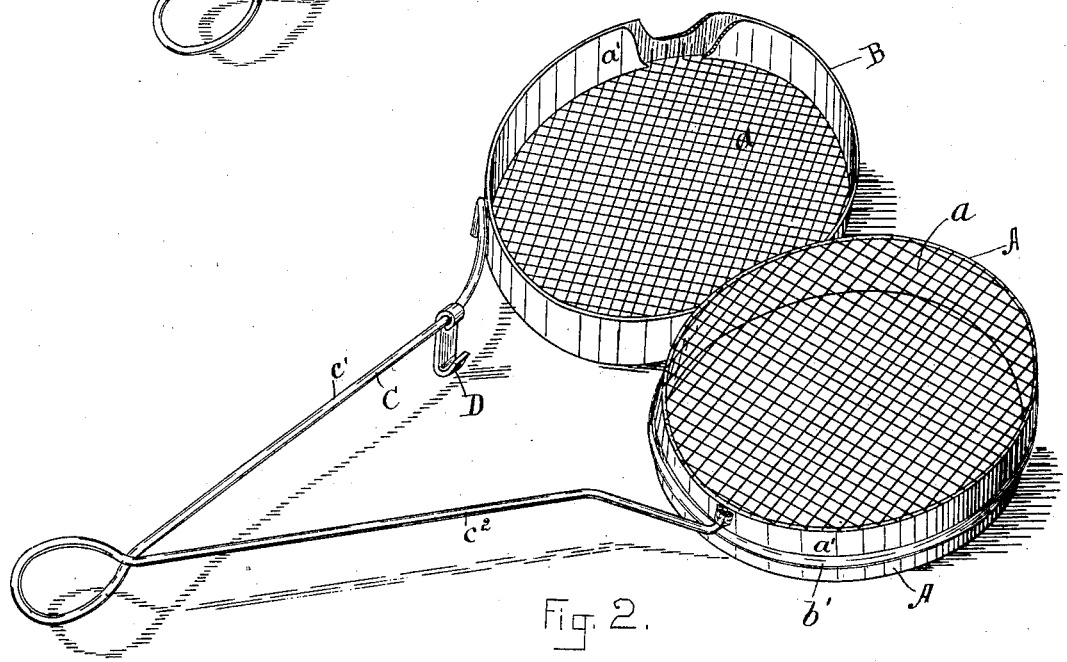

Figure 1 shows the broiler or toaster closed, and Fig. 2 represents it open.

The invention relates to the following-described improvement in broilers and toasters.

Referring to the drawings, A represents one section of the device, and B the other. These sections are substantially counterparts in form, with the exception that one is made slightly smaller than the other, so as to fit within the other, as shown in Fig. 1. Each section has the wire net-work $a$ and the rings $a'$ which inclose the turned edge of the net-work, and are riveted or soldered together. The metal rings of section B are slightly larger than the rings of section A, so that the section may shut within the section B to the bead $b'$. The two parts are connected with each other by the long wire C, which is bent into the form of a spring or hinged handle, $c$, and the part $c'$ is united to the lower section and the part $c^2$ to the upper section. By means of this handle the two parts can be moved laterally in relation to each other, so that the article to be toasted or broiled or otherwise treated may be placed within the holder and removed therefrom, and when open the two members of the toaster or broiler bear the relation to each other as shown in Fig. 2, and when closed as represented in Fig. 1.

The two parts are locked together when closed by means of a ring or clamp, D, adapted to slip upon the two arms of the handle, and when used to lock the two parts together it has the position represented in Fig. 1. When unlocked, it is moved upon and away from the holders toward the ends of the handles, and swings upon one arm thereof, as represented in Fig. 2.

The advantages of this broiler and toaster arise from the ease with which any article can be placed therein and the facility with which the broiler can be turned, with the certainty that its contents will not escape therefrom.

It is obvious that this device can be used for many purposes besides broiling or toasting— such, for instance, as a drier or as a corn-popper, or a great many other household purposes—and that it may be of any other shape than circular.

Having thus fully described my invention, I claim and desire to secure by Letters Patent of the United States—

1. As a new article of manufacture, a broiler or toaster comprising the sections A B, each of which has a wire net-work, $a$, and one of which is made slightly larger than the other, and the flexible or yielding handle $c$, whereby the two sections may be moved vertically and laterally in relation to each other, all substantially as and for the purposes described.

2. A broiler or toaster having the two sections or parts A B, formed substantially as described, the flexible or yielding handle $c$, formed as described, whereby the two sections are fastened together in a manner to provide vertical and lateral movements in relation to each other, and the locking device D, all substantially as and for the purposes described.

3. A broiler or toaster having one section, B, provided with the net-work $a$ and the bead $b'$, and another section, A, having the wire net-work $a$, and adapted to shut over the frame of the section B, and the connecting-handle $c$, all substantially as and for the purposes described.

MARY G. BARBOUR.

Witnesses:
 IRA A. ABBOTT,
 FRANCIS H. PEARL.